US008764024B2

(12) United States Patent
Deiss

(10) Patent No.: US 8,764,024 B2
(45) Date of Patent: Jul. 1, 2014

(54) PRECOMPRESSED SEALING TAPE

(75) Inventor: Martin Deiss, Abtsgmuend (DE)

(73) Assignee: ISO-Chemie GmbH (DE)

( * ) Notice: Subject to any disclaimer, the term of this patent is extended or adjusted under 35 U.S.C. 154(b) by 0 days.

(21) Appl. No.: 13/598,227

(22) Filed: Aug. 29, 2012

(65) Prior Publication Data

US 2012/0321830 A1 Dec. 20, 2012

Related U.S. Application Data

(62) Division of application No. 12/489,990, filed on Jun. 23, 2009, now Pat. No. 8,317,200.

(30) Foreign Application Priority Data

Jun. 23, 2008 (EP) .................................... 08011347
Jun. 16, 2009 (EP) .................................... 09162813

(51) Int. Cl.

*F16J 15/08* (2006.01)
*F16J 15/10* (2006.01)
*B32B 9/00* (2006.01)
*B32B 33/00* (2006.01)

(52) U.S. Cl.

USPC ........... 277/652; 277/651; 277/654; 428/40.1

(58) Field of Classification Search

USPC ................. 277/312, 314, 316, 651, 652, 654; 428/40.1

See application file for complete search history.

(56) References Cited

U.S. PATENT DOCUMENTS

| | | | | |
|---|---|---|---|---|
| 4,204,373 | A * | 5/1980 | Davidson | 52/204.1 |
| 4,356,676 | A * | 11/1982 | Hauptman | 52/396.04 |
| 6,672,597 | B1 * | 1/2004 | Irrgeher et al. | 277/650 |
| 8,241,721 | B2 * | 8/2012 | Deiss | 428/40.1 |
| 8,317,200 | B2 * | 11/2012 | Deiss | 277/316 |
| 8,318,280 | B2 * | 11/2012 | Deiss | 428/40.1 |
| 8,329,275 | B2 * | 12/2012 | Deiss | 428/40.1 |
| 8,349,426 | B2 * | 1/2013 | Deiss | 428/40.1 |
| 2010/0047548 | A1 * | 2/2010 | Deiss | 428/223 |
| 2011/0143121 | A1 * | 6/2011 | Deiss | 428/317.1 |
| 2011/0143122 | A1 * | 6/2011 | Deiss | 428/317.1 |

FOREIGN PATENT DOCUMENTS

WO WO 98/45565 * 10/1998

* cited by examiner

*Primary Examiner* — Vishal Patel
*Assistant Examiner* — Nicholas L Foster
(74) *Attorney, Agent, or Firm* — Jansson Munger McKinley & Shape Ltd.

(57) ABSTRACT

The precompressed sealing tape for sealing a joint includes an elastically re-expandable foam strip and a foil-type wrapping, which completely surrounds the foam strip and thus holds it in a precompressed state. A transverse surface of the foam strip is pressed against a strip-like element of stiff material, which is arranged inside the wrapping. A double-sided adhesive tape connects the foam strip to the strip-like element, and the strip-like element is adhesively connected to the foil-type wrapping.

7 Claims, 3 Drawing Sheets

PRECOMPRESSED SEALING TAPE

CROSS REFERENCE TO RELATED APPLICATIONS

This application is a divisional of U.S. patent application Ser. No. 12/489,990, filed Jun. 23, 2009, now U.S. Pat. No. 8,317,200. The entire contents of such application is incorporated herein by reference. This application also claims priority based on European patent applications 08 011 347.5 and EP 09 162 813.1, filed Jun. 23, 2008 and Jun. 16, 2009, respectively.

FIELD OF THE INVENTION

The present invention pertains to pre-compressed or precompressed sealing tape for sealing a joint, such as the joint between a frame profile of a window or door and the wall of a building.

BACKGROUND

A sealing strip for attachment to a window frame is known from EP 0 530 653 B1. This strip consists of a rigid channel with a U-shaped cross section and an elastically compressed foam strip arranged therein. The channel is closed off by a dimensionally stable cover strip, which is held in detachable, positively-engaging connection with the front region of the channel walls. The cover strip is connected in a banner-like manner to a limp strip element, which is guided over one edge of the cover strip and into the channel of the sealing strip. By pulling on the limp strip element, the cover strip can be detached from the channel, so that the compressed foam strip can expand. This design is extremely complicated.

A sealing tape which consists of a surface strip for attachment to a frame profile with a foam strip arranged on top of the surface strip is described in U.S. Pat. No. 4,204, 373 to Davidson. The foam strip is covered by a sheet of paper or plastic, which is adhered to the surface strip and holds the foam strip in the compressed state. Rip cords, which can be used to tear open the sheet after the frame profile equipped with the sealing strip has been installed in the building structure, extend along the edge of the cover sheet.

A precompressed sealing tape is known from EP 1 131 525 B1. This tape consists of an elastically re-expandable foam strip of rectangular cross section, which, in the compressed state, is completely surrounded by a wrapping, which consists of a sheet of plastic. The plastic sheet forms a tear-off tab extending in the longitudinal direction of the sealing tape, in that the plastic sheet is bonded to itself to form a predetermined tear site. To hold the foam strip in place inside the pocket formed in this way, the bottom surface of the strip is bonded to the wrapping, and the bottom surface of the wrapping can in turn be attached to a frame profile by means of separate adhesive means, such as double-sided adhesive tape.

Sealing tape of this type is adhered to the frame profile to be sealed, and after the frame profile has been installed in the rough opening in the wall of the building, the wrapping is torn open so that the foam strip is able to re-expand elastically and thus seal off the frame profile against the wall. The disadvantage of such known sealing tapes, however, is that they can be produced only in relatively narrow widths, since, as a result of the recovery force of the precompressed sealing tape, they assume an oval-to-round shape within the wrapping. Such shape is unsuitable for installation as desired. Because of the continually increasing requirements on sealing in buildings, however, it is desirable to have the ability to provide precompressed sealing tapes of any desired width in order to achieve higher sealing values, especially better thermal insulation and better sound damping.

SUMMARY OF THE INVENTION

It is an object of the present invention to provide a precompressed sealing tape which is of simple design, is easy to handle, can be delivered in any desired width and provides superior sealing properties.

According to an aspect of the invention, the sealing tape includes an elastically re-expandable foam strip extending farther in a longitudinal direction than in a transverse direction and comprising two lateral surfaces and two transverse surfaces connecting the lateral surfaces. A foil-type wrapping is included which completely surrounds the foam strip and thus holds the foam strip in a precompressed state. At least a first transverse surface of the foam strip is pressed against a strip-like element, which is arranged inside the wrapping and which comprises at least a certain resistance to bending in the transverse direction. A second transverse surface of the foam strip, which is opposite to the first transverse surface, is firmly connected to the foil-type wrapping.

As a result, the compressed rectangular shape of the foam strip remains preserved even in the case of a wide sealing tape. In addition, the sealing tape can be produced and handled easily, while at least a portion of the foil-type wrapping remains in the joint together with the foam strip.

The strip-like element is preferably limp in the longitudinal direction. In this case, the sealing tape can be wound up into a roll, which considerably simplifies the transport and storage of the sealing tape.

The wrapping preferably comprises a tear-open tab extending in the longitudinal direction, which serves as a pulling element for opening the wrapping. Thus, after the sealing tape has been pre-installed on a frame component to be sealed, the wrapping can be easily opened by the user.

Alternatively, the strip-like element can comprise a terminal section projecting beyond the foam strip in the transverse direction to serve as a pulling element for opening the wrapping. In this case, the user first attaches the sealing tape to the frame component to be sealed and then simply pulls on the projecting terminal section of the strip-like element to tear open the wrapping and to allow the foam strip to expand. It is also possible to open the wrapping first by means of a tear-off tab and then to pull out the strip-like element.

It can be advantageous for the wrapping to be provided with at least one predetermined tear site, preferably a perforation line, extending in the longitudinal direction of the sealing tape, as a result of which defined, predetermined tear points are formed and the opening of the wrapping is simplified.

To provide further and reliable adhesion of the foam strip to the wrapping even after the wrapping has been opened, the second transverse surface of the foam strip, which is not pressed against the strip-like element, is preferably equipped with a double-sided adhesive strip.

To reinforce the rectangular shape of the foam strip in the precompressed state, a second strip-like element, which is resistance to bending in the transverse direction, can be provided in the area of the second transverse surface.

This second strip-like element preferably is also arranged inside the wrapping. The wrapping is arranged around both strip-like elements and the foam strip and can apply its force to the transverse surfaces by means of the bending-resistant strip-like elements. In this case, the double-sided adhesive strip preferably connects the foam strip to the second strip-like element, which in turn is bonded adhesively to the wrapping.

To provide the desired sealing of the frame component, the wrapping is preferably covered on its outside surface by a piece of double-sided adhesive tape, preferably in the area of the second transverse surface, which is not pressed against the first strip-like element. This adhesive tape can be covered by a peel-off cover sheet to ensure safe transport after production. Thus the sealing tape according to the invention can already be pre-installed on the frame component to be sealed, and at the construction site it will be necessary merely to set the frame component into the rough opening in the building and to open the wrapping to allow the foam strip to expand.

The wrapping is preferably bonded adhesively to both sides of the terminal section, which makes handling easier. By providing two predetermined tear sites simultaneously in the wrapping, the efficiency and easy of the opening step can be further improved.

It is preferable to provide the strip-like element with slots in the transverse direction to make it even easier to pull the strip-like element out laterally after the wrapping has been opened.

In a particularly preferred embodiment, in the area of one of the lateral surfaces of the foam strip, a foil-type extension strip is arranged within the wrapping. The extension strip is firmly connected to the foam strip next to the strip-like element in a first connecting area and is firmly connected to the foil-type wrapping in a second connecting area. This extension strip serves as an expansion reserve of the foil-type wrapping and thus covers the whole lateral surface of the sealing tape after expansion of the foam strip.

The method of sealing a joint by means of a sealing tape according to the invention includes the steps of providing a precompressed sealing tape including an elastically re-expandable foam strip and a foil-type wrapping which completely surrounds the foam strip and thus holds it in a precompressed state. A transverse surface of the foam strip is pressed against a strip-like element, which is arranged inside the wrapping and provides resistance to bending in the transverse direction. The method further includes the steps of inserting the sealing tape into the joint, opening the foil-type wrapping, and removing the strip-like element from the foam strip with the foam strip and at least a portion of the foil-type wrapping remaining in the joint.

It is possible to open the foil-type wrapping by means of removing, i.e., pulling out, the strip-like element, so that the steps of opening the foil-type wrapping and removing the strip-like element can be performed in a particularly easy and simultaneous manner. Further, it is possible to insert the sealing tape into the joint only after having executed the steps of opening the foil-type wrapping and removing the strip-like element. This is possible particularly when the expansion of the foam strip is considerably retarded due to a sticky impregnation.

In order to open the foil-type wrapping, preferably at least one predetermined tear site and, more preferably, two predetermined tear sites are torn through. Thereby it can be assured that only a predetermined portion of the foil-type wrapping remains in the joint.

BRIEF DESCRIPTION OF THE DRAWINGS

The invention is explained in greater detail below in conjunction with the exemplary embodiments illustrated in the drawings.

DETAILED DESCRIPTION OF THE INVENTION

Figure 1:
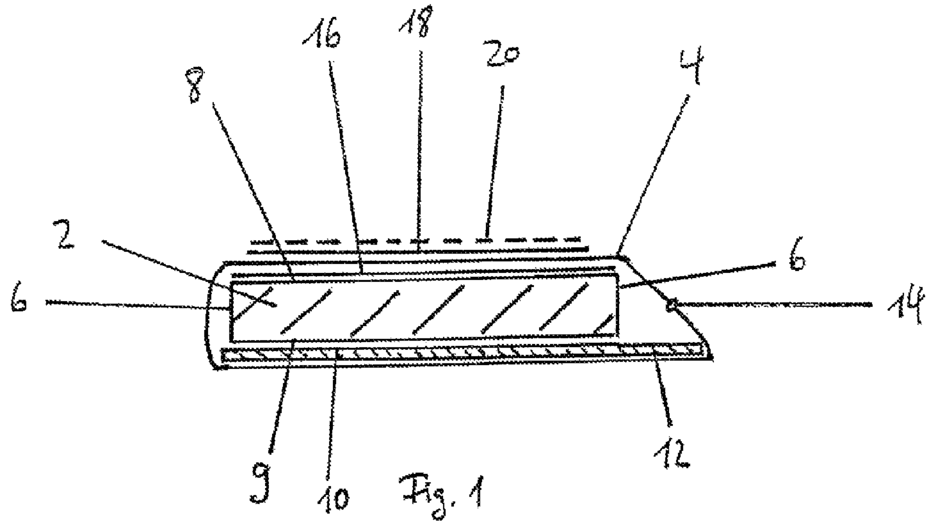
FIG. 1 is a cross-sectional view of a first embodiment of the precompressed sealing tape for sealing a joint according to the present invention.

In the drawings, the foam strips, wrappings, adhesive tapes, strip-like elements, and cover sheets are shown a certain distance away from each other so that the individual elements which form the sealing tape can be distinguished clearly from each other. It should be understood that these elements lie generally directly on top of each other.

FIG. 1 shows a first preferred embodiment in which a foam strip 2 has a rectangular cross section, is surrounded by a foil-type wrapping 4, and is held by foil-type wrapping 4 in a precompressed state. Foam strip 2 can be made of any desired open-cell or closed-cell soft foam, e.g., polyurethane or polyethylene foam, and can be impregnated for delayed re-expansion. A multilayer arrangement of several different foam materials laminated to each other is also conceivable, as is an arrangement of an impregnated foam layer to a foam layer which is not impregnated. Foam strip 2 extends farther in its longitudinal direction than in its transverse direction and includes two lateral surfaces 6 and two transverse surfaces 8, 9 (top surface 8 and bottom surface 9), which connect the two lateral surfaces 6.

Foil-type wrapping 4 can be constructed of plastic sheet or foil material, a fabric scrim, paper, or some other type of material which is suitable for the purpose cited. Laminated sheets which consist of a plastic sheet laminated to a support material (e.g., non-woven material) or fabric-reinforced sheets can also be used. All these materials are described by the term “foil-type”. Combinations of these materials are also possible. Thermoplastic film, shrink film and similar material which contracts under the effect of heat are preferred.

At least one transverse surface—in the present example bottom surface 9 of the foam strip 2—is pressed onto a strip-like element 10, which comprises at least a certain resistance to bending in the transverse direction. The bending resistance should be high enough that strip-like element 10, without itself becoming too severely deformed, can absorb the force which proceeds from the attempt by the foam strip to expand. Such bend resistance usually lead to the deformation of the flexible wrapping 4 into a tube with an oval or even round cross section.

Cardboard, for example, is suitable as a material for strip-like element 10, but any other type of stiff material such as rigid plastic can be used. Strip-like element 10 is preferably limp in the longitudinal direction, so that the sealing tape can be wound up into a roll. Single-layer corrugated cardboard with only one cover layer is suitable, for example, wherein the ribs or waves extend in the transverse direction. Strip-like element 10 can comprise a projecting terminal section 12, which projects beyond one lateral surface 6 of foam strip 2 and serves as a means by which the strip-like element can be pulled out. In a preferred embodiment, strip-like element 10 is continuous only in the area of terminal section 12, whereas transverse notches are formed in strip-like element 10 over the remaining width. This makes it possible to bend strip-like element 10 during the pulling-out process described below after foil-type wrapping 4 has been opened.

Figure 3:
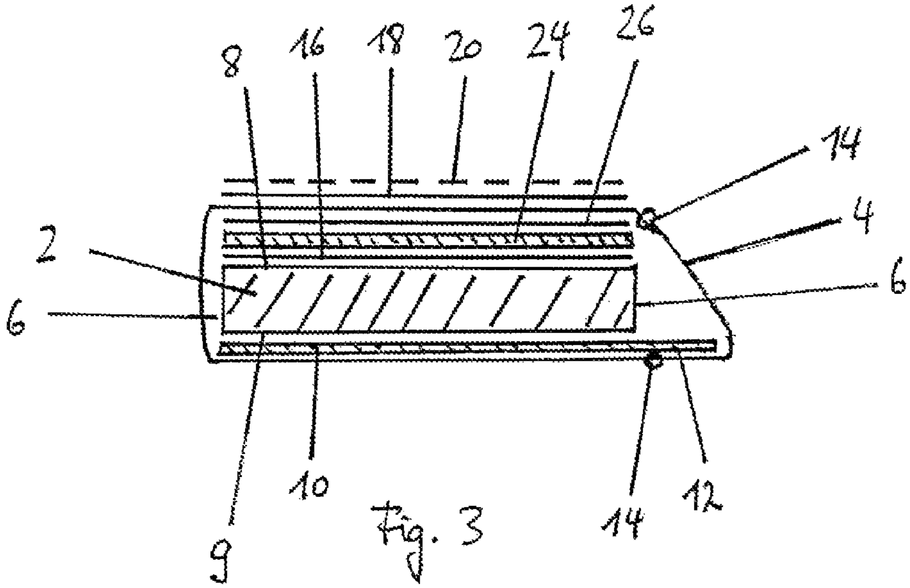
FIG. 3 is a cross-sectional view of a third embodiment of the precompressed sealing tape for sealing a joint according to the present invention.
Figure 4:
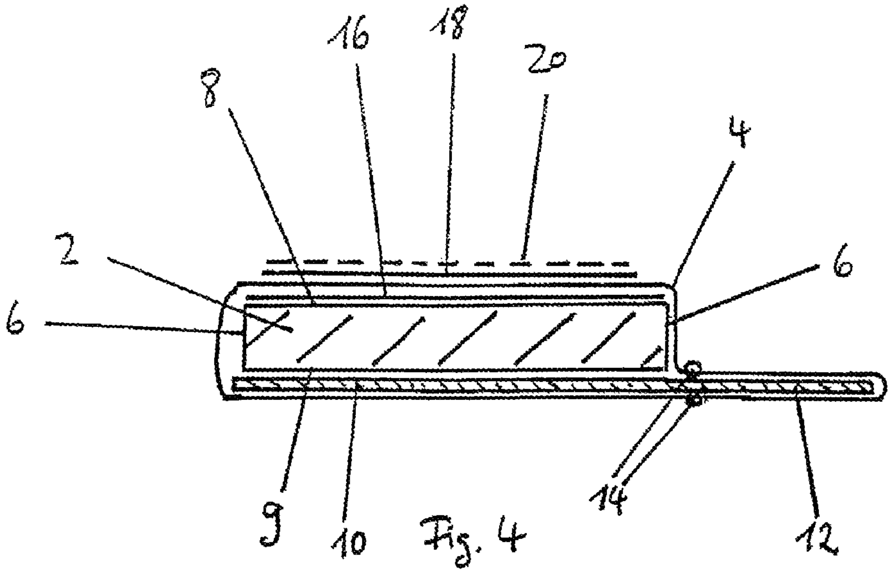
FIG. 4 is a cross-sectional view of a fourth embodiment of the precompressed sealing tape for sealing a joint according to the present invention.

In the preferred embodiments of FIGS. 1, 3, and 4, projecting terminal section 12 is suitable as a means for gripping strip-like element 10 and for opening foil-type wrapping 4 by pulling the terminal section outward. For this purpose, at least one predetermined tear site 14, preferably a perforation line, can be provided in foil-type wrapping 4 as a predetermined tear point in the area of lateral surface 6 beyond which projecting terminal section 12 of strip-like element 10 projects. The positions of perforation lines 14 shown in FIGS. 3 and 4 are preferred, because in these cases, after foil-type wrapping 4 has been opened, little or no material remains on lateral surface 6, and a large part of the wrapping which is not bonded in place (see below) slides over expanded foam strip 2 and arranges itself over the other lateral surface 6. That can be beneficial when, for example, foil-type wrapping 4 comprises special sealing properties, which serve to provide a special sealing function for the other lateral surface 6, such as that of a vapor diffusion barrier.

It is also possible to tear open foil-type wrapping 4 by pulling on projecting terminal section 12 even if there is no perforation line 14. Such is the case where foil-type wrapping 4 does not withstand strong tensile forces or the wrapping is intended to be cut open with a knife or opened by some other auxiliary means.

In the present example, a double-sided adhesive strip 16 is arranged between the other transverse surface of foam strip 2, here top surface 8, and foil-type wrapping 4 and thus connects the two elements firmly together. The firm connection between foam strip 2 and foil-type wrapping 4 can also be provided by other means, for example thermoplastic welding or lamination.

An adhesive tape 18, which serves to attach the sealing tape to a structural element such as a frame profile to be incorporated into a structure, is attached to the outside surface of foil-type wrapping 4 in the area of the same transverse surface 8. The outside surface of adhesive tape 18 facing upward here is preferably covered by a peel-off cover sheet 20, shown in broken line. Cover sheet 20 may be a piece of silicone paper 10 or the like, and will remain operative as long as the sealing tape has not yet been attached to the structural element.

It should be emphasized at this point that, in practice, adhesive tape 6 is very often realized by a layer of adhesive, which has been applied to a piece of silicone paper or the like, which is then laminated in this form to foil-type wrapping 4. In some cases, a scrim fabric or a support film, non-woven fabric, or the like can also be embedded in this adhesive layer to increase the tensile strength. The expression "adhesive tape" used above includes adhesive layers of the type described herein. The same applies to the term "adhesive strip".

Figure 2:
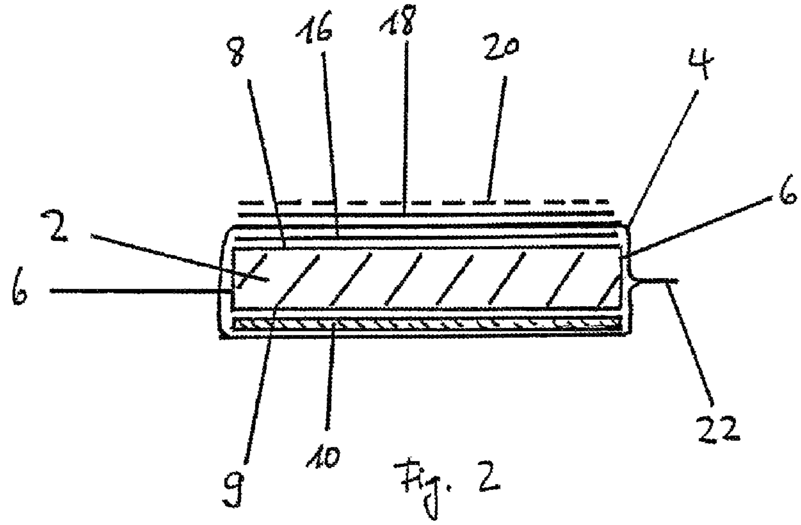
FIG. 2 is a cross-sectional view of a second embodiment of the precompressed sealing tape for sealing a joint according to the present invention.

FIG. 2 shows a similar embodiment, in which the wrapping can be torn open by means of a tear-off tab 22. The two sections of foil-type wrapping 4 are held together near foam strip 2 by a seam, which can be a welded seam, an adhesively bonded seam, or a sewn seam, and which can be opened by pulling on the tear-off tab 22. Tear-off tab 22 is formed by projecting sub-sections of foil-type wrapping 4, or can be in the form of a thread or the like. In such cases, projecting terminal section 12 of strip-like element 10 serves merely as an aid in removing the element after foil-type wrapping 4 has been opened. Under certain conditions, projecting terminal section 12 can also be omitted entirely, as shown in FIG. 2.

The preferred embodiments shown in FIGS. 1-4 are illustrated in what amounts to an idealized form of the cross section of foam strip 2. Typically, top surface 8 of foam strip 2 is pushed out slightly into a dome-like shape by the pressure acting from within, so that the cross section of foam strip 2 in the precompressed state assumes a shape deviating to some extent, although not excessively, from that of a rectangle.

For further reinforcement of the rectangular form, it is possible, as shown in FIG. 3, to arrange a second strip-like element 24 between the second transverse surface—here, top surface 8—and foil-type wrapping 4. This second strip-like element is connected to foam strip 2 by adhesive layer 16 and to foil-type wrapping 4 by means of another adhesive strip 26. Strip-like element 24 has the same properties as first strip-like element 10 and would remain in the joint after foil-type wrapping 4 is opened. Adhesive strip 26 can be omitted, if strip-like element 24 is connected adhesively to the wrapping in some other way, e.g., by means of gluing, lamination or the like.

As shown in FIG. 4, the wrapping can be adhesively bonded to strip-like element 12 in the area of terminal section 12 of the element, e.g., by gluing or by laminating the two elements together. A seam is also conceivable, which passes through the two loops of foil-type wrapping 4 and terminal section 12, connects these elements to each other, and simultaneously serves as a predetermined tear site for foil-type wrapping 4. Alternatively, it is also possible in this case that an additional L-shaped adhesive strip (not shown) could be adhered to the outside surface of the seam all the way up to a perforation line 14, which, as shown in FIG. 3, is located in the area of the edge of top surface 8. Accordingly, the tensile force will be transmitted past the seam to perforation line 14.

The precompressed sealing tape can be offered wound up into a roll or sold as a straight strip of sealing tape of a predetermined length. The sealing tape can also be attached to the frame component to be sealed by means of adhesive tape 18 even before the frame is installed or even before it is transported. After the frame has been installed in the rough opening in the building at the construction site, it is necessary then merely to open foil-type wrapping 4 by cutting it with a knife or by pulling on projecting terminal section 12 or on tear-off tab 22. The areas of foil-type wrapping 4 bonded to the frame component and to the transverse surface of foam strip 2 bonded to foil-type wrapping 4 remain in place. Foam strip 2 expands in the direction of the transverse surface which was pressed onto first strip-like element 10 and thus seals the joint. As this is happening, the part of foil-type wrapping 4 not adhering to the frame component slides along expanding foam strip 2 and ultimately covers preferably at least one section of the other lateral surface 6 in the final state.

Figure 5:
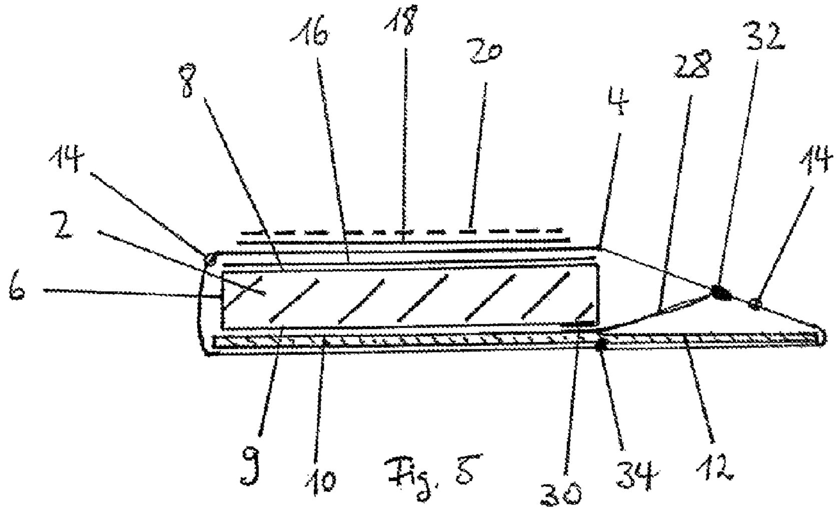
FIG. 5 is a cross-sectional view of a fifth embodiment of the precompressed sealing tape for sealing a joint according to the present invention.
Figure 6:
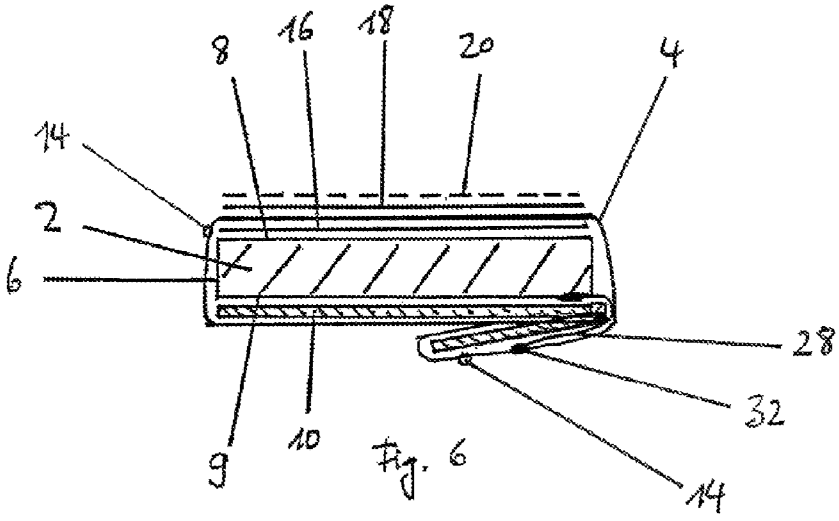
FIG. 6 is a cross-sectional view of the embodiment of FIG. 5 in a folded state of the projecting terminal section of the strip-like element.

FIGS. 5 and 6 illustrate another preferred embodiment of the sealing tape according to the present invention. In this embodiment a foil-type extension strip 28 is arranged within foil-type wrapping 4. Extension strip 28 is made of one of the materials enumerated above for foil-type wrapping 4. In a particularly preferred embodiment, extension strip 28 is made of a vapor diffusion resistant material.

Extension strip 28 is firmly connected to foam strip 2 in a first connecting area 30. First connecting area 30 is preferably arranged on bottom surface 9 of foam strip 2 between the foam strip 2 and strip-like element 10. Connecting area 30 can be located in the lower end area of lateral surface 6 of foam strip 2, which end area lies next to strip-like element 10. The firm connection between extension strip 28 and foam strip 2 is achieved preferably by means of an adhesive tape, but it can also be established in another way, for example by means of thermoplastic welding.

Extension strip 28 extends within an inner space of foil-type wrapping 4 and is firmly connected to foil-type wrapping 4 in a second connecting area 32. The connection at second connecting area 32 is achieved preferably by gluing or by other permanent connecting means. Extension strip 28 thus serves as an expansion reserve of foil-type wrapping 4. Particularly, after removal of strip-like element 10 and the opening of foil-type wrapping 4 achieved thereby (in the embodiment shown by tearing through two predetermined tear sites 14), foil-type extension strip 28 remains permanently on foam strip 2 and covers its lateral surface 6. Foil-type extension strip 28 together with the portion of foil-type wrapping 4 which is connected to extension strip 28 in second connecting area 32, also cover lateral surface 6.

Thus it is possible to pull out strip-like element 10 in a direction towards the inner side of the wall of the building, which makes the handling at the construction site simpler. At the same time lateral surface 6 of foam strip 2 facing towards the inner side of the wall of the building is permanently covered by a diffusion resistant foil.

Extension strip 28 may also comprise a loop, which can be arranged in the area between foam strip 2 and strip-like element 10 or in the area of the empty inner space of foil-type wrapping 4 so as to elongate the expansion reserve. Alternately extension strip 28 may comprise several folds glued together. However, in the simplest embodiment the expansion reserve is formed when a portion of foil-type wrapping 4 and extension strip 28 are firmly connected to each other in connecting area 32, which is arranged a certain distance apart from lateral surface 6 of foam strip 2.

In the situation where an additional connecting area 34 is established for a firm connection between foil-type wrapping 4 and strip-like element 10 in the transition area to projecting terminal section 12, projecting terminal section 12 may be folded down and inside as shown in FIG. 6. In this case the sealing tape may be wound up into a roll without projecting terminal section 12 impeding the winding up of the sealing tape and the transportation of the sealing tape roll.

The details shown in FIGS. 5 and 6 can also be used in the embodiments of FIGS. 1 to 4.

In practice, foam strips 2 are precompressed to such an extent that, when they expand, they preferably can increase to approximately five or six times their thickness in the precompressed state. Only about half of this expansion capacity, however, is preferably used, so that secure contact with the part of the building opposite the profile element to be sealed will be established.

The invention has been described above on the basis of the example of a foam strip 2 with a rectangular cross section to explain the features of the present invention. The term “rectangular” is also intended to include “square”. The person skilled in the art will appreciate that the invention can be realized in a corresponding manner with foam strips 2 which have cross sections deviating from that of a rectangular. The cross-sectional shape of foam strip 2 indicated here should therefore not be limiting in any manner.

While the invention has been described and illustrated in conjunction with specific preferred embodiments, it will be evident that many alternatives, modifications, variations and combinations will be apparent to those skilled in the art. Any such changes may be made without departing from the spirit and scope of the invention. The described and illustrated embodiments are to be considered in all respects only as illustrative and not restrictive. These and all similar modifications and changes are considered to be within the scope of the present invention.

What is claimed is:

1. A precompressed sealing tape for sealing a joint, the sealing tape comprising:

an elastically re-expandable foam strip extending farther in a longitudinal direction than in a transverse direction, the foam strip comprising two lateral surfaces and first and second transverse surfaces connecting the lateral surfaces; and a foil-type wrapping, which is a continuous layer of a same material and which completely encases the foam strip and thus holds it in a precompressed state;

wherein the second transverse surface of the foam strip is pressed against a strip-like element of stiff material, which is arranged inside the wrapping and comprises at least a certain resistance to bending in the transverse direction;

wherein a double-sided adhesive tape connects the foam strip directly to the strip-like element;

wherein the strip-like element is adhesively connected directly to the foil-type wrapping; and wherein the sealing tape comprises a sandwich configuration in which the strip-like element is arranged directly between the foam strip and the foil-type wrapping while adjoining both the foam strip and the foil-type wrapping and being fixedly attached to both the foam strip and the foil-type wrapping.

2. The precompressed sealing tape of claim 1 wherein the strip-like element is limp in the longitudinal direction.

3. The precompressed sealing tape of claim 2 wherein the sealing tape is wound up into a roll.

4. The precompressed sealing tape of claim 1 wherein the wrapping comprises a tear-off tab extending in the longitudinal direction, which serves as a pulling element for opening the wrapping.

5. The precompressed sealing tape of claim 1 wherein the wrapping is provided with at least one predetermined tear site extending in the longitudinal direction of the sealing tape.

6. The precompressed sealing tape of claim 1 wherein an outside surface of the wrapping is covered in the area of the second transverse surface by a double-sided adhesive tape.

7. The precompressed sealing tape of claim 6 wherein the adhesive tape arranged on the outside surface of the wrapping is covered by a peel-off cover sheet.

* * * * *